United States Patent
Kuriyama et al.

(10) Patent No.: US 9,825,330 B2
(45) Date of Patent: Nov. 21, 2017

(54) NONAQUEOUS ELECTROLYTE SECONDARY BATTERY AND BATTERY PACK

(71) Applicant: KABUSHIKI KAISHA TOSHIBA, Minato-ku (JP)

(72) Inventors: Hiromichi Kuriyama, Toda (JP); Hidesato Saruwatari, Kashiwazaki (JP); Kazuya Kuriyama, Saku (JP); Shinsuke Matsuno, Tokyo (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 164 days.

(21) Appl. No.: 14/167,288

(22) Filed: Jan. 29, 2014

(65) Prior Publication Data

US 2014/0134477 A1 May 15, 2014

Related U.S. Application Data

(63) Continuation of application No. PCT/JP2013/057301, filed on Mar. 14, 2013.

(30) Foreign Application Priority Data

Mar. 15, 2012 (JP) ................. 2012-059100

(51) Int. Cl.
*H01M 10/0567* (2010.01)
*H01M 10/0569* (2010.01)
(Continued)

(52) U.S. Cl.
CPC ....... *H01M 10/0567* (2013.01); *H01M 4/131* (2013.01); *H01M 4/366* (2013.01);
(Continued)

(58) Field of Classification Search
CPC ......... H01M 10/0567; H01M 10/0569; H01M 4/485; H01M 4/052
See application file for complete search history.

(56) References Cited

U.S. PATENT DOCUMENTS

| 7,935,441 | B2 * | 5/2011 | Tononishi | ........... H01M 2/0285 |
| | | | | 429/100 |
| 2010/0178570 | A1 * | 7/2010 | Kozono | ................. H01M 4/40 |
| | | | | 429/338 |

(Continued)

FOREIGN PATENT DOCUMENTS

| CN | 101138125 A | 3/2008 |
| CN | 101512823 A | 8/2009 |

(Continued)

OTHER PUBLICATIONS

Combined Chinese Office Action and Search Report dated Jun. 3, 2015 in Patent Application No. 201380002499.3 (with English language translation).

(Continued)

*Primary Examiner* — Ula C Ruddock
*Assistant Examiner* — Thomas Parsons
(74) *Attorney, Agent, or Firm* — Oblon, McClelland, Maier & Neustadt, L.L.P.

(57) ABSTRACT

A nonaqueous electrolyte secondary battery according to an embodiment includes a positive electrode, a negative electrode, and a nonaqueous electrolyte. The negative electrode contains a negative electrode active material. A lithium insertion-extraction reaction potential of a negative electrode active material is higher than the oxidation-reduction potential of lithium by a value of 1 V or more. The nonaqueous electrolyte contains an electrolytic salt, a nonaqueous solvent, at least one hydroxyalkylsulfonic acid, and at least one sulfonate.

15 Claims, 3 Drawing Sheets

(51) Int. Cl.
*H01M 4/485* (2010.01)
*H01M 4/131* (2010.01)
*H01M 4/36* (2006.01)
*H01M 10/052* (2010.01)

(52) U.S. Cl.
CPC ......... *H01M 4/485* (2013.01); *H01M 10/052* (2013.01); *Y02T 10/7011* (2013.01)

(56) References Cited

U.S. PATENT DOCUMENTS

| 2013/0330627 A1 | 12/2013 | Matsuno et al. |
| 2013/0330629 A1 | 12/2013 | Matsuno et al. |

FOREIGN PATENT DOCUMENTS

| JP | 2001-52738 | | 2/2001 |
| JP | 2001052738 | * | 2/2001 |
| JP | 2005-317389 | | 11/2005 |
| JP | 3815180 B2 | | 8/2006 |
| JP | 2007-053083 | | 3/2007 |
| JP | 2007-173014 | | 7/2007 |
| JP | 2007173014 | * | 7/2007 |
| JP | 2008-091327 | | 4/2008 |
| WO | WO 2006/104633 A2 | | 10/2006 |

OTHER PUBLICATIONS

Extended European Search Report dated Oct. 2, 2015 in Patent Application No. 13760767.7.
U.S. Appl. No. 14/640,934, filed Mar. 6, 2015, Kuriyama, et al.
International Preliminary Report on Patentability and Written Opinion dated Sep. 25, 2014, in International Application No. PCT/JP2013/057301 (English translation only).
International Search Report dated Jun. 25, 2013 in PCT/JP2013/057301 filed Mar. 14, 2013.
Office Action dated Nov. 24, 2015 in Chinese Patent Application No. 201380002499.3 (with English language translation).
Combined Chinese Office Action and Search Report dated Mar. 17, 2016 in Patent Application No. 201380002499.3 (with English Translation).

* cited by examiner

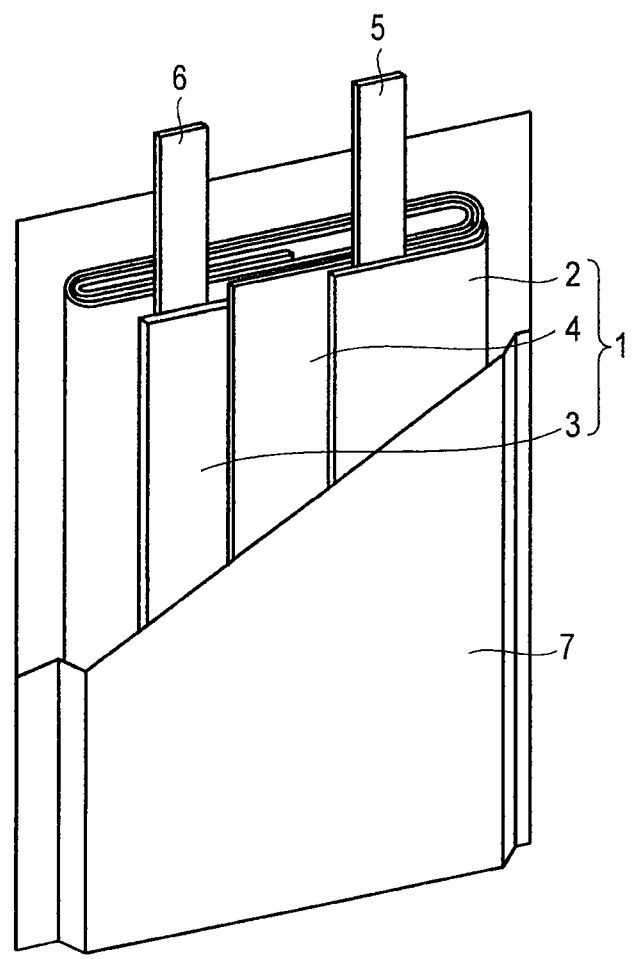
F I G. 1

NONAQUEOUS ELECTROLYTE SECONDARY BATTERY AND BATTERY PACK

CROSS-REFERENCE TO RELATED APPLICATIONS

This application is a Continuation Application of PCT Application No. PCT/JP2013/057301, filed Mar. 14, 2013 and based upon and claiming the benefit of priority from the Japanese Patent Application No. 2012-059100, filed Mar. 15, 2012, the entire contents of all of which are incorporated herein by reference.

FIELD

Embodiments of the present invention relate to a nonaqueous electrolyte secondary battery, and a battery pack including this nonaqueous electrolyte secondary battery.

BACKGROUND

In recent years, lithium ion secondary batteries using, as their negative electrode active material, a lithium titanium complex oxide such as $Li_4Ti_5O_{12}$ have been developed. For such lithium ion secondary batteries, it is known that carbon dioxide or lithium carbonate ($Li_2CO_3$) adsorbed onto their negative electrode active material is incorporated, as an impurity, into the negative electrode active material. When such a lithium ion secondary battery is stored at room temperature or a higher temperature, hydrogen fluoride (HF) generated by the hydrolysis of its electrolyte reacts with the impurity in its negative electrode to generate a carbon oxide type gas such as carbon monoxide and carbon dioxide. The generation of the gas causes a problem of the increased self-discharge, and degradation of large current characteristic due to the increased internal resistance.

It is known about lithium ion secondary batteries each having a carbon type negative electrode that a solid electrolyte interface (SEI) coat (hereinafter referred to as a "coat") is present on the surface of the negative electrode active material. This coat is generated mainly by a reductive decomposition of the nonaqueous electrolyte so as to have a function of restraining reaction between the active material and the nonaqueous electrolyte. However, in the negative electrode of which a lithium insertion-extraction reaction potential is higher than the oxidation-reduction potential of lithium by a value more than 1 V, a coat as described above, for protecting the surface of the active material, is not easily formed so that side reactions, such as gas generation, are not easily restrained.

CITATION LIST

Patent Literatures

Patent Literature 1: Jpn. Pat. Appln. KOKAI Publication No. 2008-91327
Patent Literature 2: Jpn. Pat. Appln. KOKAI Publication No. 2007-53083

BRIEF DESCRIPTION OF DRAWINGS

FIG. 1 is a perspective view showing a nonaqueous electrolyte secondary battery according to one of the embodiments in the state that the battery is partially fractured.

DETAILED DESCRIPTION

Figure 2:
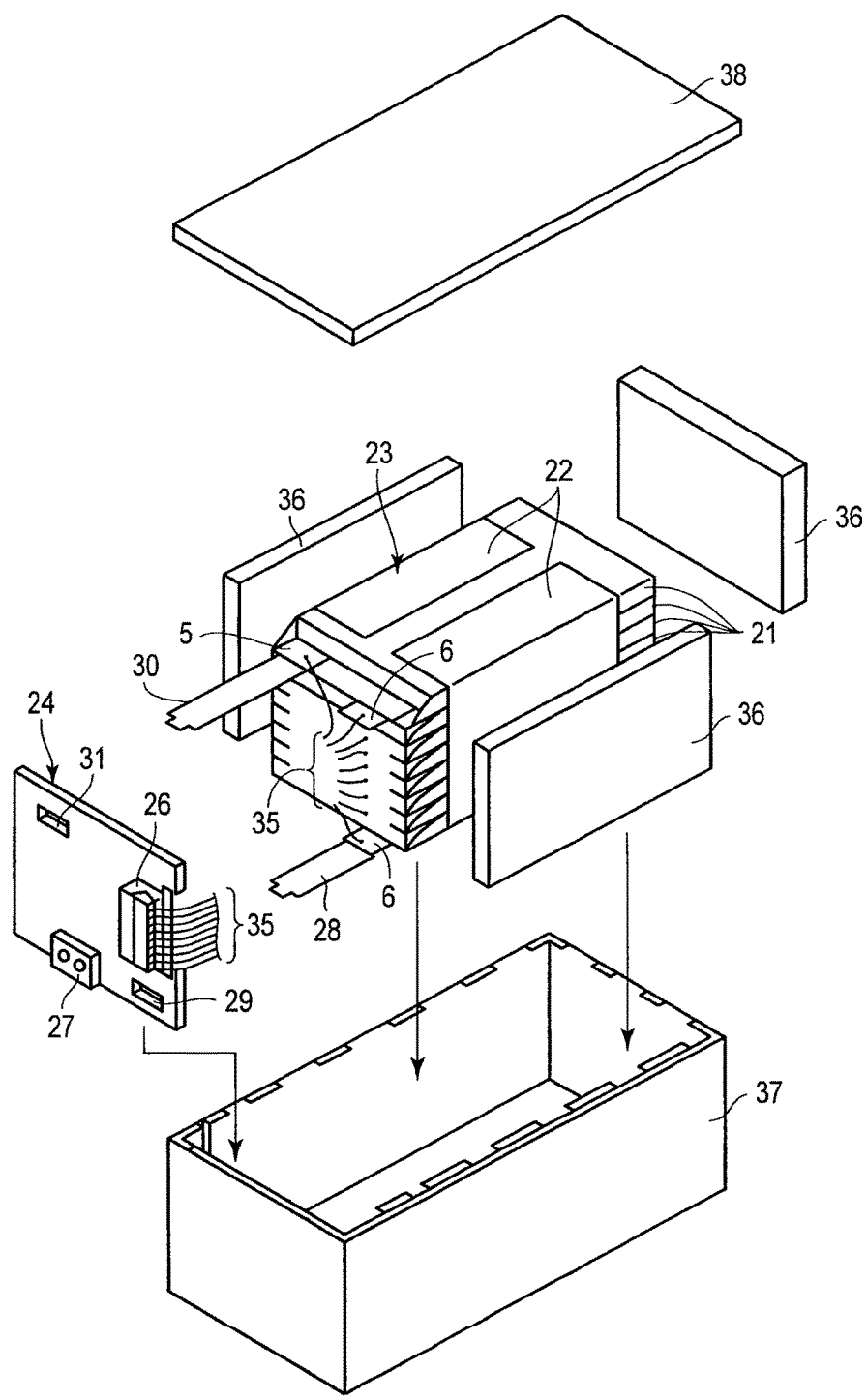
FIG. 2 is a perspective view of a battery pack according to another embodiment.

In general, a nonaqueous electrolyte secondary battery is provided. The nonaqueous electrolyte secondary battery includes a positive electrode, a negative electrode, and a nonaqueous electrolyte. The negative electrode contains a negative electrode active material of which a lithium insertion-extraction reaction potential is higher than an oxidation-reduction potential of lithium by a value of 1 V or more. The nonaqueous electrolyte contains an electrolytic salt, a nonaqueous solvent, at least one hydroxyalkylsulfonic acid, and at least one sulfonate.

Hereinafter, the embodiments of the invention will be described with reference to the drawings.

FIG. 1 is a perspective view showing a nonaqueous electrolyte secondary battery according to one of the embodiments in the state that the battery is partially fractured. A flat electrode group 1 includes a negative electrode 2, a positive electrode 3 and a separator 4. The negative electrode 2 and the positive electrode 3 are laminated over each other while sandwiching the separator 4 therebetween. By coiling this laminate into a flat shape, the electrode group 1 is formed. A belt-like negative electrode terminal 5 is electrically connected to the negative electrode 2. A belt-like positive electrode terminal 6 is electrically connected to the positive electrode 3. The electrode group 1 is held inside an exterior bag 7 made of a laminated film in the state that respective ends of the negative electrode terminal 5 and the positive electrode terminal 6 are extended out from the exterior bag 7. The laminated-film exterior bag 7 holds an unshown nonaqueous electrolyte. The electrode group 1 and the nonaqueous electrolyte are sealed up by subjecting an opening in the laminated-film exterior bag 7 to heat-sealing in the state that the negative electrode terminal 5 and the positive electrode terminal 6 are extended out.

The negative electrode 2 includes a negative electrode current collector in a flat plate form, and a negative electrode layer provided onto at least one of the two main surfaces of the negative electrode current collector. The negative electrode layer contains a negative electrode active material, a negative conductive additives, and a negative electrode binder. The respective proportions of the negative electrode active material, the negative conductive additives and the negative electrode binder contained in the negative electrode layer are preferably from 70 to 95% by weight, from 0 to 25% by weight, and from 2 to 10% by weight, respectively.

The negative electrode current collector may be a sheet containing a material high in electrical conductivity. The negative electrode current collector may be, for example, an aluminum foil or aluminum alloy foil. In the case of using the aluminum foil or aluminum alloy foil, the thickness thereof is, for example, 20 μm or less, preferably 15 μm or less. Magnesium, zinc, silicon and/or some other atom may be incorporated into the aluminum alloy foil. It is preferred that the content by percentage of transition metals, such as iron, copper, nickel and chromium, contained in the aluminum alloy foil is 1% or less.

The negative electrode active material contains a substance of which a lithium insertion-extraction potential is higher than an oxidation-reduction potential of lithium by a value of 1 V or more.

An example of the negative electrode active material is a lithium titanium oxide. Examples of the lithium titanium oxide include spinel type lithium titanate ($Li_{4+x}Ti_5O_{12}$) and ramsdellite type lithium titanate ($Li_{2+x}Ti_3O_7$). The negative electrode active material may be a single lithium titanium oxide species, or a mixture of two lithium titanium oxide species.

The upper limit of the lithium ion insertion/extraction potential (potential at which insertion and extraction reactions of lithium proceed) of the lithium titanium oxide is preferably 2 V (relative to Li/Li$^+$) or less.

The average primary particle size of the lithium titanium oxide is preferably 5 µm or less. When the average primary particle size is 5 µm or less, the oxide has a sufficient effective area contributing to the electrode reaction so that the battery can obtain a good large-current discharge property.

For the lithium titanium oxide, the specific surface area thereof is preferably from 1 to 10 m$^2$/g. When the specific surface area is 1 m$^2$/g or more, the oxide has a sufficient effective area contributing to the electrode reaction so that the battery can obtain a good large-current discharge property. On the Other hand, when the specific surface area is 10 m$^2$/g or less, reaction with the nonaqueous electrolyte is restrained so that the battery can be restrained from being lowered in charge/discharge efficiency, or undergoing the generation of gas when stored.

Another example of the negative electrode active material is a titanium oxide which transforms a lithium titanium oxide during charging and discharging. An example of conductive additives for a negative electrode is a carbon material. The carbon material is preferably high in performance of absorbing an alkali metal, and electroconductivity. Examples of the carbon material include acetylene black, and carbon black.

Examples of the negative electrode binder include polytetrafluoroethylene (PTFE), polyvinylidene fluoride (PVdF), fluorine-contained rubbers, styrene-butadiene rubber (SBR), polypropylene (PP), polyethylene (PE), and carboxymethyl cellulose (CMC).

The negative electrode terminal 5 is made of a material high in electroconductivity. A portion of the negative electrode terminal 5 is electrically connected to a portion of the negative electrode 2. Preferably, a portion of the negative electrode terminal 5 is connected to a portion of the negative electrode current collector. The negative electrode terminal 5 functions as a conductor for shifting electrons between the negative electrode 2 and an external circuit.

The positive electrode 3 contains a positive electrode current collector in a flat plate form, and a positive electrode layer provided on at least one of the two main surfaces of the positive electrode current collector. The positive electrode layer contains a positive electrode active material, a conductive additive, and a positive electrode binder. The respective proportions of the positive electrode active material, a conductive additive for a positive electrode and the positive electrode binder contained in the positive electrode layer are preferably from 78 to 95% by weight, from 3 to 20% by weight, and from 2 to 7% by weight, respectively.

The positive electrode current collector may be a sheet containing a material high in electrical conductivity. The positive electrode current collector may be, for example, an aluminum foil or aluminum alloy foil. In the case of using the aluminum foil or aluminum alloy foil, the thickness thereof is, for example, 20 µm or less, preferably 15 µm or less. Magnesium, zinc, silicon and/or some other atom may be incorporated into the aluminum alloy foil. It is preferred that the content by percentage of transition metals, such as iron, copper, nickel and chromium, contained in the aluminum alloy foil is 1% or less.

Examples of the positive electrode active material include lithium manganese complex oxides (such as $LiMn_2O_4$ or $LiMnO_2$), lithium nickel complex oxides (such as $LiNiO_2$), lithium cobalt complex oxides ($LiCoO_2$), lithium nickel cobalt complex oxides (such as $LiNi_{1-x}Co_xO_2$, $0<x\leq1$), lithium manganese cobalt complex oxides (such as $LiMn_xCo_{1-x}O_2$, $0<x\leq1$), lithium iron phosphate ($LiFePO_4$), and lithium complex phosphate compounds (such as $LiMn_xFe_{1-x}PO_4$, $0<x\leq1$).

Examples of the positive conductive additives include acetylene black, carbon black, and graphite.

Examples of the positive electrode binder include polytetrafluoroethylene (PTFE), polyvinylidene fluoride (PVdF), fluorine-contained rubbers, ethylene-butadiene rubber (SBR), polypropylene (PP), polyethylene (PE), and carboxymethyl cellulose (CMC).

The positive electrode terminal 6 is made of a material high in electroconductivity. A portion of the positive electrode terminal 6 is electrically connected to a portion of the positive electrode 2. Preferably, a portion of the positive electrode terminal 6 is connected to a portion of the positive electrode current collector. The positive electrode terminal 6 functions as a conductor for shifting electrons between the positive electrode 3 and the external circuit.

The separator 4 is made of an insulating material to prevent electrical contact between the positive electrode and the negative electrode. Preferably, the separator 4 is made of a material through which an electrolyte can penetrate, or has a shape through which an electrolyte can penetrate. Examples of the separator 4 include synthetic resin-nonwoven, polyethylene porous films, polypropylene porous films, and cellulose based separators.

The nonaqueous electrolyte contains a nonaqueous solvent, an electrolyte, at least one hydroxyalkylsulfonic acid, and at least one sulfonate.

The electrolyte is, for example, an alkali salt, preferably a lithium salt. Examples of the lithium salt include lithium hexafluorophosphate ($LiPF_6$), lithium tetrafluoroborate ($LiBF_4$), arsenic lithium hexafluoride ($LiAsF_6$), lithium perchlorate ($LiClO_4$), and lithium trifluorometasulfonate ($LiCF_3SO_3$). The electrolyte is preferably lithium hexafluorophosphate ($LiPF_6$) or tetrafluoroborate ($LiBF_4$). The concentration of the electrolyte in the nonaqueous electrolyte is preferably from 0.5 to 2 mol/L.

The nonaqueous solvent may be a known nonaqueous solvent usable in lithium ion secondary batteries. First examples of the nonaqueous solvent are cyclic carbonates such as ethylene carbonate (EC), and propylene carbonate (PC). Second examples of the nonaqueous solvent are chain carbonates such as dimethyl carbonate, methylethyl carbonate, and diethyl carbonate; γ-butyrolactone, acetonitrile, methyl propionate, and ethyl propionate; cyclic ethers such as tetrahydrofuran, and 2-methyltetrahydrofuran; and chain ethers such as dimethoxyethane, and diethoxyethane. The solvents of the second examples are generally lower in viscosity than those of the first examples. The nonaqueous solvent may be a solvent in which one or more of the solvents of the second examples are mixed with one or more of those of the first examples.

Preferably, the hydroxyalkylsulfonic acid has a hydroxy group at one of the two terminals of the molecular chain thereof, and a sulfo group at the other thereof, and has 1 to 5 (both inclusive) carbon atoms. The hydroxyalkylsulfonic acid is preferably from the group consisting of hydroxymethanesulfonic acid, 2-hydroxyethanesulfonic acid, 3-hydroxypropanesulfonic acid, 4-hydroxybutanesulfonic acid, 5-hydroxypentanesulfonic acid, 3-hydroxypropenesulfonic acid, and 4-hydroxybutylenesulfonic acid.

The concentration of the hydroxyalkylsulfonic acid in the nonaqueous electrolyte is, for example, from 0.01 to 10% by mass, both inclusive. The concentration of the hydroxyalkylsulfonic acid is preferably from 0.1 to 2% by mass, both inclusive.

The sulfonate has a cyclic structure having 2 to 5 (both inclusive) carbon atoms, and is preferably selected from the group consisting of 1,2-ethanesultone, 1,3-propanesultone, 1,4-butanesultone, 1,5-pentanesultone, 1,3-propenesultone, and 1,4-butenesultone.

The concentration of the sulfonate in the nonaqueous electrolyte is, for example, from 0.01 to 10% by mass, both inclusive. The concentration of the sulfonate is preferably from 0.1 to 2% by mass, both inclusive.

The nonaqueous electrolyte secondary battery preferably includes a coat for covering the surface of the negative electrode active material. As will also be described later, the coat is preferably a coat originating from the hydroxyalkylsulfonic acid contained in the nonaqueous electrolyte and containing a sulfur atom. The thickness of the coat is preferably from 0.1 to 10 nm, both inclusive.

The thickness of the coat is measurable by, for example, surface element analysis with X-ray photoelectron spectrometry. Specifically, while the coat is etched with Ar gas, the X-ray photoelectron spectrum thereof is measured. When a peak assigned to S2p located at a binding energy of about 170 eV disappears, the depth at the peak-loss from the surface is measured and the thickness can be calculated out from the depth. Note that the value thereof is gained as a value estimated in terms of simultaneously etched $SiO_2$. When the atom presence ratio of sulfur atoms estimated from S2p peak is lower than 0.1%, the peak of S2p is identified to be lost.

In the nonaqueous electrolyte secondary battery of the embodiment, an oxidation reaction is caused in the negative electrode 2 and a reduction reaction is caused in the positive electrode 3 when the battery is discharged. Electrons generated by the oxidation reaction in the negative electrode 2 are passed through the negative electrode terminal 5 into the external circuit, and then carried through the positive electrode terminal 6 into the positive electrode 3 to be used for the reduction reaction. By the oxidation reaction in the negative electrode 2, lithium ions are released from the negative electrode 2 into the nonaqueous electrolyte. The lithium ions are absorbed from the nonaqueous electrolyte into the positive electrode 3 to be used for the reduction reaction. Due to the effect of the shift of the electrons that is caused by these reactions, the external circuit gains electric energy.

When the battery is charged, reactions reverse to the reactions at the time of the discharge are caused. Specifically, due to an external power supply, electrons are supplied through the negative electrode terminal 5 to the negative electrode 2. In the negative electrode 2, a reduction reaction is caused by use of the electrons and lithium ions absorbed from the nonaqueous electrolyte Electrons are shifted from the positive electrode 3 through the positive electrode terminal 6 to the external power supply. At this time, lithium ions are released from the positive electrode 3 into the nonaqueous electrolyte to cause an oxidation reaction. By these reactions, the state of the negative electrode 2 and the positive electrode 2 can be returned to the state before the battery was discharged.

When the nonaqueous electrolyte contains water, the sulfonate contained in the nonaqueous electrolyte react with the water in a hydrolysis reaction. In other words, the sulfonate traps the water in the nonaqueous electrolyte.

The hydroxyalkylsulfonic acid contained in the nonaqueous electrolyte is adsorbed onto the surface of the negative electrode active material. As a result, a dense and thin coat is formed on the surface of the negative electrode active material. Since this coat originates from the hydroxyalkylsulfonic acid, the coat contains sulfur atoms. It is considered that the coat is in such a form that molecules of the hydroxyalkylsulfonic acid are adsorbed onto the surface of the negative electrode active material. Thus, the coat is different from the coat which is formed onto a carbon-based negative electrode by electrochemical decomposition of materials in nonaqueous electrolyte.

The nonaqueous electrolyte secondary battery according to the embodiment produces an advantageous effect that the battery is restrained from being degraded in quality by storage thereof at high temperature, as will be detailed below.

When water is present in the nonaqueous electrolyte secondary battery, the water may cause the generation of hydrogen gas or may react with the supportive salt to generate hydrogen fluoride (HF). The thus generated hydrogen gas causes a rise in the internal pressure in the battery. The generated HF may corrode the active materials, and further reacts with lithium carbonate ($Li_2CO_3$) contained in the active materials to cause the generation of carbon dioxide gas.

As described above, in the nonaqueous electrolyte secondary battery according to the embodiment, the sulfonate contained in the nonaqueous electrolyte traps water in the nonaqueous electrolyte. This results in the restraint of the generation of hydrogen gas and hydrogen fluoride by water. As a result of the restraint of the generation of hydrogen gas, a rise in the internal pressure in the battery is restrained. As a result of the restraint of the generation of hydrogen fluoride, the corrosion of the active materials is restrained so that the generation of carbon dioxide gas is restrained. In particular, the sulfonate has a higher effect of trapping water than other substances each having an ester bond, such as any phosphate.

In any nonaqueous electrolyte secondary battery using, as a negative electrode active material thereof, a spinel type lithium titanate ($Li_4Ti_5O_{12}$), or any other substance of which a lithium insertion-extraction reaction potential is higher than the oxidation-reduction potential of lithium by a value of 1 V or more, the equilibrium electrode potential is higher than that in any lithium ion secondary battery using a carbon based negative electrode. Thus, in the former battery, a coat is less easily formed by a reductive decomposition of the nonaqueous solvent or the electrolyte. As a result of the inventors' examinations, it has been understood that when lithium titanate in the form of fine particles is used, large amount of carbon dioxide is easily adsorbed, subsequently causing the generation of gas. Consequently, when charge and discharge are performed in a nonaqueous electrolyte secondary battery using spinel type lithium titanate in the form of fine particles, a large proportion of carbon dioxide present beforehand in the nonaqueous electrolyte secondary battery is once dissolved in its nonaqueous electrolyte, and then adsorbed again onto the negative electrode surface to be gasified. Carbon dioxide gas generated in this way causes the nonaqueous electrolyte secondary battery to swell.

In contrast thereto, as described above, in the nonaqueous electrolyte secondary battery according to the embodiment, a dense and thin coat is foamed on the surface of the negative electrode active material from the hydroxyalkylsulfonic acid contained in the nonaqueous electrolyte. The thus formed coat prevents carbon dioxide dissolved from the negative electrode into the nonaqueous electrolyte from being readsorbed onto the surface of the negative electrode active material, so that the generation of carbon dioxide is restrained. As a result of the restraint of the generation of carbon dioxide gas, the battery is decreased in self-discharge capacity when stored.

Furthermore, the nonaqueous electrolyte secondary battery according to the embodiment contains, both of sulfonate and hydroxyalkylsulfonic acid are contained in the nonaqueous electrolyte so that it is possible to obtain an effect that the sulfonate traps water and an effect that the hydroxyalkylsulfonic acid forms the coat on the surface of the negative electrode simultaneously. When the nonaqueous electrolyte contains only the sulfonate, the effect based on the coat cannot be sufficiently obtained. When the nonaqueous electrolyte contains only the hydroxyalkylsulfonic acid, the effect based on the trap of water cannot be sufficiently obtained. Hence, a gas which is generated by reaction between $Li_2CO_3$ and HF cannot be restrained, which remain in the negative electrode. In contrast thereto, by incorporating, into the nonaqueous electrolyte, the sulfonate and the hydroxyalkylsulfonic acid simultaneously, the trapping of water and the formation of a coat can be simultaneously attained so that the generation of gas can be sufficiently restrained. As a result, the battery can avoid a problem of being increased in self-discharge capacity or a problem of being degraded in large current characteristic, which follows an increase in the internal resistance. As a result, the battery can avoid a problem of being increased in self-discharge capacity or a problem of being degraded in large current characteristic, which follows an increase in the internal resistance.

By using not any sulfonate having a chain structure but a sulfonate having a cyclic structure, the generation of gas and an increase in the resistance can be restrained. Specifically, the sulfonate having a chain structure undergoes a hydrolysis reaction to generate a sulfonic acid and an alcohol. The released alcohol causes the generation of gas and an increase in the resistance. The increase in the resistance causes, for example, a capacity fade during charge/discharge cycling. Thus, the use of the sulfonate having a cyclic structure makes it possible to avoid the generation of gas and the increase in the resistance.

By using the sulfonate with some carbon atoms from two to five, a higher effect of trapping water can be gained. This is because the sulfonate with some carbon atoms from 2 to 5 has higher in hydrolysis reactivity than sulfonates with more than five carbon atoms.

When the concentration of the sulfonate in the nonaqueous electrolyte is further to be within the range of 0.01 to 10% by mass, both inclusive, the effect of trapping water can be sufficiently gained without increasing the resistance.

When the number of the carbon atoms in the hydrocarbon moiety of the hydroxyalkylsulfonic acid is to be a value from 1 to 5, the formation of the coat can be further promoted so that the generation of gas can be effectively restrained. By contrast, when the number of the carbon atoms in the hydroxyalkylsulfonic acid is more than 5, interference is caused between molecules thereof so that the coat-formation based on adsorption becomes insufficient.

When the concentration of the hydroxyalkylsulfonic acid in the nonaqueous electrolyte is further to be within the range of 0.01 to 10% by mass, both inclusive, the electrode surface is not corroded so that the generation of gas can be sufficiently restrained.

EXAMPLES

[Production of Batteries]

<Fabrication of Each Positive Electrode>

To N-methylpyrrolidone were added 91% by weight of lithium nickel cobalt oxide powder ($LiNi_{0.8}Co_{0.2}O_2$) as a positive electrode active material, 2.5% by weight of acetylene black, 3% by weight of graphite, and 3.5% by weight of polyvinylidene fluoride (PVfF), and these components were mixed with each other to prepare a slurry. This slurry was coated onto both surfaces of a current collector made of an aluminum foil having a thickness of 15 μm, and the workpiece was dried. The workpiece was then pressed to fabricate each positive electrode having a positive electrode layer having a density of 3.0 g/cm³ on each side of current collector.

<Fabrication of Each Negative Electrode>

To NMP were added to the composite of 85% by weight of spinel type lithium titanium oxide ($Li_4Ti_5O_{12}$) powder having a lithium-insertion potential of 1.55 V (relative to Li/Li⁺) as a negative electrode active material, 5% by weight of graphite, 3% by weight of acetylene black, and 7% by weight of PVfF, and these components were mixed with each other to prepare a slurry. This slurry was coated onto both surfaces of a current collector made of an aluminum foil having a thickness of 11 μm, and the workpiece was dried. The workpiece was then pressed to fabricate each negative electrode having a negative electrode layer having a density of 2.0 g/cm³ on each side of current collector.

<Production of Each Electrode Group>

The positive electrode produced as described above, a separator made of a polyethylene porous film having a thickness of 20 μm, and the negative electrode fabricated as described above were laminated onto each other in this order, and then the laminated body was wound into a spiral form to position the negative electrode at the outmost side thereof. In this way, each electrode group was produced. This was heated and pressed at 90° C. to produce a flat electrode group having a width of 58 mm, a height of 95 mm and a thickness of 3.0 mm. The resultant electrode group was held in an exterior component made of a laminated film of 0.1 mm thickness. This exterior component is composed of an aluminum foil having a thickness of 40 μm and polypropylene layers formed on both surfaces of the aluminum foil. The electrode group held in this way in the exterior component was vacuum-dried at 80° C. for 24 hours.

<Preparation of Nonaqueous Electrolye>

Ethylene carbonate (EC) and methylethyl carbonate (MEC) were mixed with each other at a ratio by volume of 1/2 to prepare a mixed solvent. Into this mixed solvent, lithium hexafluorophosphate ($LiPF_6$) is dissolved into this mixed solvent to give a concentration of 1.0 mol/L. In this way, a nonaqueous electrolyte was prepared.

<Addition of Additives>

A sulfonate and a sulfonic acid were added to the nonaqueous electrolyte. The addition was made to give a composition shown in Table 1 described below for a battery of each of Examples 1 to 49.

TABLE 1

| | Composition and Blend Ratio of Nonaqueous electrolyte ("%" denotes % by mass) | |
|---|---|---|
| | Sulfonate | Hydroxy alkyl sulfonic acid |
| Example 1 | 0.01% 1,3-Propanesultone | 0.01% 3-Hydroxypropanesulfonic acid |
| Example 2 | 0.01% 1,3-Propanesultone | 0.1% 3-Hydroxypropanesulfonic acid |
| Example 3 | 0.01% 1,3-Propanesultone | 1% 3-Hydroxypropanesulfonic acid |
| Example 4 | 0.01% 1,3-Propanesultone | 10% 3-Hydroxypropanesulfonic acid |
| Example 5 | 0.1% 1,3-Propanesultone | 0.01% 3-Hydroxypropanesulfonic acid |
| Example 6 | 0.1% 1,3-Propanesultone | 0.1% 3-Hydroxypropanesulfonic acid |
| Example 7 | 0.1% 1,3-Propanesultone | 1% 3-Hydroxypropanesulfonic acid |
| Example 8 | 0.1% 1,3-Propanesultone | 10% 3-Hydroxypropanesulfonic acid |
| Example 9 | 1% 1,3-Propanesultone | 0.01% 3-Hydroxypropanesulfonic acid |
| Example 10 | 1% 1,3-Propanesultone | 0.1% 3-Hydroxypropanesulfonic acid |
| Example 11 | 1% 1,3-Propanesultone | 1% 3-Hydroxypropanesulfonic acid |
| Example 12 | 1% 1,3-Propanesultone | 10% 3-Hydroxypropanesulfonic acid |
| Example 13 | 10% 1,3-Propanesultone | 0.01% 3-Hydroxypropanesulfonic acid |
| Example 14 | 10% 1,3-Propanesultone | 0.1% 3-Hydroxypropanesulfonic acid |
| Example 15 | 10% 1,3-Propanesultone | 1% 3-Hydroxypropanesulfonic acid |
| Example 16 | 10% 1,3-Propanesultone | 10% 3-Hydroxypropanesulfonic acid |
| Example 17 | 0.01% 1,4-Buthanesultone | 0.01% 4-Hydroxybuthanesulfonic acid |
| Example 18 | 0.01% 1,4-Buthanesultone | 0.1% 4-Hydroxybuthanesulfonic acid |
| Example 19 | 0.01% 1,4-Buthanesultone | 1% 4-Hydroxybuthanesulfonic acid |
| Example 20 | 0.01% 1,4-Buthanesultone | 10% 4-Hydroxybuthanesulfonic acid |
| Example 21 | 0.1% 1,4-Buthanesultone | 0.01% 4-Hydroxybuthanesulfonic acid |
| Example 22 | 0.1% 1,4-Buthanesultone | 0.1% 4-Hydroxybuthanesulfonic acid |
| Example 23 | 0.1% 1,4-Buthanesultone | 1% 4-Hydroxybuthanesulfonic acid |
| Example 24 | 0.1% 1,4-Buthanesultone | 10% 4-Hydroxybuthanesulfonic acid |
| Example 25 | 1% 1,4-Buthanesultone | 0.01% 4-Hydroxybuthanesulfonic acid |
| Example 26 | 1% 1,4-Buthanesultone | 0.1% 4-Hydroxybuthanesulfonic acid |
| Example 27 | 1% 1,4-Buthanesultone | 1% 4-Hydroxybuthanesulfonic acid |
| Example 28 | 1% 1,4-Buthanesultone | 10% 4-Hydroxybuthanesulfonic acid |
| Example 29 | 10% 1,4-Buthanesultone | 0.01% 4-Hydroxybuthanesulfonic acid |
| Example 30 | 10% 1,4-Buthanesultone | 0.1% 4-Hydroxybuthanesulfonic acid |
| Example 31 | 10% 1,4-Buthanesultone | 1% 4-Hydroxybuthanesulfonic acid |
| Example 32 | 10% 1,4-Buthanesultone | 10% 4-Hydroxybuthanesulfonic acid |
| Example 33 | 1% 1,3-Propanesultone | 0.01% 4-Hydroxybuthanesulfonic acid |
| Example 34 | 1% 1,3-Propanesultone | 0.1% 4-Hydroxybuthanesulfonic acid |
| Example 35 | 1% 1,3-Propanesultone | 1% 4-Hydroxybuthanesulfonic acid |
| Example 36 | 1% 1,3-Propanesultone | 10% 4-Hydroxybuthanesulfonic acid |
| Example 37 | 1% 1,4-Buthanesultone | 0.01% 3-Hydroxypropanesulfonic acid |
| Example 38 | 1% 1,4-Buthanesultone | 0.1% 3-Hydroxypropanesulfonic acid |
| Example 39 | 1% 1,4-Buthanesultone | 1% 3-Hydroxypropanesulfonic acid |
| Example 40 | 1% 1,4-Buthanesultone | 10% 3-Hydroxypropanesulfonic acid |
| Example 41 | 1% 1,5-Penthanesultone | 1% 3-Hydroxypropanesulfonic acid |
| Example 42 | 1% 1,3-Propenesultone | 1% 3-Hydroxypropanesulfonic acid |
| Example 43 | 1% 1,4-Buthylenesultone | 1% 3-Hydroxypropanesulfonic acid |
| Example 44 | 1% 1,3-Propanesultone | 1% Hydroxymethanesulfonic acid |
| Example 45 | 1% 1,3-Propanesultone | 1% 2-Hydroxyethanesulfonic acid |
| Example 46 | 1% 1,3-Propanesultone | 1% 4-Hydroxybuthanesulfonic acid |
| Example 47 | 1% 1,3-Propanesultone | 1% 5-Hydroxypentanesulfonic acid |
| Example 48 | 1% 1,3-Propanesultone | 1% 3-Hydroxypropenesulfonic acid |
| Example 49 | 1% 1,3-Propanesultone | 1% 4-Hydroxybuthylenesulfonic acid |

<Addition of Nonaqueous Electrolyte>

The nonaqueous electrolyte was added to each of the exterior bags containing the electrode group. Thereafter, the exterior bag was sealed up. In this way, each secondary battery having a structure as shown in FIG. 1 was produced. The secondary battery was charged at 2.8 V and a rate of 0.2 C in a temperature environment of 25° C., and then discharged at a rate of 0.2 C until the voltage thereof reached 1.5 V. Thereafter, the battery was charged at a rate of 1 C to give an SOC of 50%, and then stored at a predetermined temperature for a predetermined period (aging treatment). Thereafter, the battery was charged at a rate of 1 C, and then discharged at a rate of 1 C. The initial capacity thereof was then measured.

In this way, a nonaqueous electrolyte secondary battery of each of Examples 1 to 49 was produced.

Furthermore, similarly to the production of the nonaqueous electrolyte secondary batteries of Examples 1 to 49, batteries of Examples 1-A to 19-A were produced. However, hydroxyalkylsulfonic acid conditions, and sulfonate conditions were changed as shown in Table 2 described below to attain the production.

Example 1-A

A nonaqueous electrolyte secondary battery was produced in the same way as used in Examples 1 to 49 except that no hydroxyalkylsulfonic acid or sulfonate was added to the nonaqueous electrolyte.

Examples 2-A to 15-A

In nonaqueous electrolyte secondary batteries of Examples 2-A to 15-A, a hydroxyalkylsulfonic acid and a sulfonate were added thereto. However, the amount of one or each of the two was changed. Specifically, in each of Examples 2-A, 3-A, 5-A, 6-A, 9-A, 10-A, 12-A and 13-A, either one of the hydroxyalkylsulfonic acid and the sulfonate was not added thereto, or was made short. In each of Examples 4-A, 7-A, 8-A, 11-A, 14-A and 15-A, either one or each of the hydroxyalkylsulfonic acid and the sulfonate was added thereto in an excessive proportion. Under the same conditions as in Example 1 except the above, these batteries were produced.

Examples 16-A to 18-A

In each of Examples 16-A to 18-A, a sulfonate and a hydroxyalkylsulfonic acid different from those used in Examples 1 to 49 were used. Specifically, a sulfonate having 6 or more carbon atoms and a hydroxyalkylsulfonic acid shown in Table 2 were used. Under the same conditions as in Examples 1 to 49 except the above, batteries were produced.

Example 19-A

In Example 19-A, a chain sulfonate was used instead of the cyclic sulfonate. Under the same conditions as in Examples 1 to 49 except the above, batteries were produced.

TABLE 2

Composition and Blend Ratio of Nonaqueous electrolyte
("%" denotes % by mass)

| | Sulfonate | Hydroxy alkyl sulfonic acid |
|---|---|---|
| Example 1-A | — | — |
| Example 2-A | — | 1% 3-Hydroxypropanesulfonic acid |
| Example 3-A | 0.001% 1,3-Propanesultone | 1% 3-Hydroxypropanesulfonic acid |
| Example 4-A | 20% 1,3-Propanesultone | 1% 3-Hydroxypropanesulfonic acid |
| Example 5-A | 1% 1,3-Propanesultone | — |
| Example 6-A | 1% 1,3-Propanesultone | 0.001% 3-Hydroxypropanesulfonic acid |
| Example 7-A | 1% 1,3-Propanesultone | 20% 3-Hydroxypropanesulfonic acid |
| Example 8-A | 20% 1,3-Propanesultone | 20% 3-Hydroxypropanesulfonic acid |
| Example 9-A | — | 1% 4-Hydroxybuthanesulfonic acid |
| Example 10-A | 0.001% 1,4-Buthanesultone | 1% 4-Hydroxybuthanesulfonic acid |
| Example 11-A | 20% 1,4-Buthanesultone | 1% 4-Hydroxybuthanesulfonic acid |
| Example 12-A | 1% 1,4-Buthanesultone | — |
| Example 13-A | 1% 1,4-Buthanesultone | 0.001% 4-Hydroxybuthanesulfonic acid |
| Example 14-A | 1% 1,4-Buthanesultone | 20% 4-Hydroxybuthanesulfonic acid |
| Example 15-A | 20% 1,4-Buthanesultone | 20% 4-Hydroxybuthanesulfonic acid |
| Example 16-A | 1% 1,6-Hexanesultone | 1% 3-Hydroxypropanesulfonic acid |
| Example 17-A | 1% 1,3-Propanesultone | 1% 6-Hydroxyhexanesulfonic acid |
| Example 18-A | 1% 1,6-Hexanesultone | 1% 6-Hydroxyhexanesulfonic acid |
| Example 19-A | 1% Methyl Methanesulfonate | 1% 3-Hydroxypropanesulfonic acid |

[Tests]
<Initial Capacity Measurement>
For Examples 1 to 49, and Examples 1-A and 19-A, the batteries were charged at 2.8 V and a rate of 1C in a temperature environment of 25° C., and then discharged at a rate of 1C until the voltage reached 1.5 V. In this way, the respective discharge capacities thereof were measured. The discharge capacities were each calculated out as a value relative to the value of Example 1-A. The respective values calculated out for these examples are shown in Tables 3 and 4. The relative value of each of the initial discharge capacities is calculated out in accordance with the following equation I:

$$D_{PC}=(D_X)/(D_{1-A})\times 100 \qquad \text{(equation 1)}$$

wherein $D_{PC}$ denotes the discharge capacity after the cycle; $D_X$, the initial discharge capacity of Example X; and $D_{1-A}$, the initial discharge capacity of Example 1-A.

<Observation of Sulfur Atoms in Surface of Each of the Negative Electrodes>
The thickness of a coat formed in the negative electrode surface after the aging treatment, which contained sulfur atoms, was measured by surface element analysis with X-ray photoelectron spectroscopy. While the coat was etched with Ar gas, the X-ray photoelectron spectrum thereof was measured. When a peak assigned to S2p located at a binding energy of about 170 eV was lost, the depth at the peak-loss from the surface was measured and the thickness of the coat was calculated out from the depth. The value thereof was gained as a value estimated in terms of $SiO_2$. The respective coat thicknesses of the examples are shown in Tables 3 and 4.

<High-Temperature Storage Test>
Examples 1 to 49 were each stored at an SOC of 50% in a high-temperature environment of 65° C. for 2 weeks. The battery swelling thereof after the storage, and the self-discharge capacity thereof during the storage are shown in Table 3.

In the table, the item "Battery swelling (relative ratio)" represents a value of the battery swelling of each of the batteries relative to the battery swelling of Examples 1-A. Specifically, the swelling of the battery was calculated out in accordance with the following equation 2:

$$B=T_1-T_0 \qquad \text{(equation 2)}$$

wherein B denotes the battery swelling; $T_1$, the battery thickness after the storage; and $T_o$, the battery thickness before the storage.

Subsequently, in accordance with the following equation 3, the resultant value was converted to the relative value of the battery swelling:

$$B_{rel}=B_X/B_{1-A}\times 100 \qquad \text{(equation 3)}$$

wherein $B_{rel}$ denotes the relative value of the battery swelling; $3B_X$, the battery swelling of Example X; and $B_{1-A}$, the battery swelling of Example 1-A.

The item "Self-discharge capacity (relative ratio)" represents a value of the self-discharge capacity of each of the batteries relative to the self-discharge capacity of Examples 1-A. Specifically, the self-discharge capacity of the battery was calculated out in accordance with the following equation 4:

$$D_{self}=C_0-C_1 \qquad \text{(equation 4)}$$

wherein $D_{self}$ denotes the self-discharge capacity; $C_0$, the charge capacity at the time of starting the storage; and $C_1$, the remaining capacity after the storage.

Subsequently, in accordance with the following equation 5, the resultant value was converted to the relative value of the self-discharge capacity:

$$D_{self\text{-}rel} = D_{self\,X}/D_{self\,1\text{-}A} \times 100 \quad \text{(equation 5)}$$

wherein $D_{self\text{-}rel}$ denotes the relative value of the self-discharge capacity; $D_{self\,X}$, the self-discharge capacity of Example X; and $D_{self\,1\text{-}A}$, the self-discharge capacity of Example 1-A.

The charge capacity of each of the batteries at the time of starting the storage is a capacity giving an SOC of 50% relative to an actual capacity of the battery. The remaining capacity after the storage is defined as the discharge capacity remaining when the battery was discharged to 1.5 V at a rate of 1 C in a temperature environment of 25° C. after the high-temperature storage.

For each of Examples 1-A to 19-A also, the battery swell quantity after the storage and the self-discharge capacity were calculated in the same way as in Examples 1 to 49. The resultant values are each shown in Table 4 as a value relative to the value of Example 1-A.

<Cycle Test>

Examples 1 to 49, and Examples 1-A to 19-A were each subjected to 10000 cycles at a current rate of 2 C in the voltage range of 1.5 to 2.8 V in a temperature environment of 50° C. Thereafter, the discharge capacity thereof was calculated out as a value relative to the value of Example 1-A. The discharge capacity was a discharge capacity generated when the battery was charged at a rate of 1 C and 2.8 V in a temperature environment of 25° C. after the cycles, and then discharged at a rate of 1 C in a temperature environment of 25° C. until the voltage reached 1.5 V. Results of the examples are shown in Tables 3 and 4.

TABLE 3

| | Initial Discharge Capacity (relative ratio) | Thickness of Protective Layer containing S (nm) | Swelling of Battery (relative ratio) | Self-Discharge Capacity (relative ratio) | Discharge Capacity after the Cycles (relative ratio) |
|---|---|---|---|---|---|
| Example 1 | 100 | 0.3 | 80 | 81 | 105 |
| Example 2 | 100 | 2 | 71 | 72 | 105 |
| Example 3 | 100 | 3 | 62 | 59 | 107 |
| Example 4 | 100 | 9 | 53 | 56 | 104 |
| Example 5 | 100 | 0.4 | 63 | 78 | 110 |
| Example 6 | 100 | 2 | 56 | 66 | 110 |
| Example 7 | 100 | 3 | 49 | 50 | 112 |
| Example 8 | 100 | 9 | 42 | 44 | 101 |
| Example 9 | 100 | 0.4 | 41 | 63 | 116 |
| Example 10 | 100 | 2 | 36 | 47 | 118 |
| Example 11 | 100 | 4 | 32 | 25 | 120 |
| Example 12 | 100 | 10 | 27 | 16 | 102 |
| Example 13 | 99 | 2 | 45 | 59 | 103 |
| Example 14 | 99 | 2 | 40 | 53 | 104 |
| Example 15 | 99 | 4 | 35 | 31 | 101 |
| Example 16 | 98 | 10 | 30 | 16 | 100 |
| Example 17 | 100 | 0.3 | 86 | 88 | 100 |
| Example 18 | 100 | 2 | 76 | 81 | 104 |
| Example 19 | 100 | 3 | 67 | 75 | 108 |
| Example 20 | 100 | 9 | 57 | 72 | 100 |
| Example 21 | 100 | 0.5 | 68 | 88 | 106 |
| Example 22 | 100 | 2 | 60 | 72 | 109 |
| Example 23 | 100 | 3 | 53 | 63 | 116 |
| Example 24 | 100 | 9 | 45 | 53 | 101 |
| Example 25 | 100 | 0.3 | 54 | 59 | 116 |
| Example 26 | 100 | 2 | 48 | 50 | 117 |
| Example 27 | 100 | 3 | 42 | 34 | 116 |

TABLE 3-continued

| | Initial Discharge Capacity (relative ratio) | Thickness of Protective Layer containing S (nm) | Swelling of Battery (relative ratio) | Self-Discharge Capacity (relative ratio) | Discharge Capacity after the Cycles (relative ratio) |
|---|---|---|---|---|---|
| Example 28 | 100 | 9 | 36 | 25 | 101 |
| Example 29 | 99 | 2 | 50 | 53 | 100 |
| Example 30 | 99 | 2 | 44 | 41 | 101 |
| Example 31 | 99 | 4 | 39 | 31 | 101 |
| Example 32 | 98 | 10 | 33 | 25 | 100 |
| Example 33 | 100 | 0.5 | 41 | 72 | 113 |
| Example 34 | 100 | 2 | 36 | 56 | 116 |
| Example 35 | 100 | 3 | 32 | 34 | 121 |
| Example 36 | 100 | 9 | 27 | 25 | 100 |
| Example 37 | 100 | 0.5 | 54 | 53 | 109 |
| Example 38 | 100 | 2 | 48 | 41 | 108 |
| Example 39 | 100 | 4 | 42 | 25 | 122 |
| Example 40 | 100 | 9 | 36 | 19 | 103 |
| Example 41 | 100 | 4 | 49 | 34 | 116 |
| Example 42 | 100 | 3 | 32 | 22 | 118 |
| Example 43 | 100 | 4 | 42 | 28 | 114 |
| Example 44 | 100 | 3 | 32 | 25 | 119 |
| Example 45 | 100 | 3 | 32 | 22 | 122 |
| Example 46 | 100 | 3 | 32 | 28 | 121 |
| Example 47 | 100 | 2 | 34 | 44 | 119 |
| Example 48 | 100 | 3 | 32 | 22 | 122 |
| Example 49 | 100 | 2 | 32 | 31 | 117 |

TABLE 4

| | Initial Discharge Capacity (relative ratio) | Thickness of Protective Layer containing S (nm) | Swelling of Battery (relative ratio) | Self-Discharge Capacity (relative ratio) | Discharge Capacity after the Cycles (relative ratio) |
|---|---|---|---|---|---|
| Example 1-A | 100 | — | 100 | 100 | 100 |
| Example 2-A | 100 | 3 | 98 | 63 | 100 |
| Example 3-A | 100 | 3 | 96 | 59 | 100 |
| Example 4-A | 85 | 4 | 25 | 31 | 75 |
| Example 5-A | 100 | — | 45 | 100 | 88 |
| Example 6-A | 100 | — | 44 | 97 | 95 |
| Example 7-A | 88 | 23 | 25 | 28 | 61 |
| Example 8-A | 80 | 26 | 19 | 25 | 42 |
| Example 9-A | 100 | 3 | 99 | 59 | 100 |
| Example 10-A | 100 | 3 | 97 | 63 | 102 |
| Example 11-A | 86 | 3 | 32 | 41 | 71 |
| Example 12-A | 100 | — | 60 | 100 | 86 |
| Example 13-A | 100 | — | 59 | 94 | 94 |
| Example 14-A | 85 | 19 | 36 | 31 | 62 |
| Example 15-A | 81 | 21 | 27 | 25 | 60 |
| Example 16-A | 100 | 4 | 93 | 63 | 95 |
| Example 17-A | 100 | — | 44 | 97 | 96 |
| Example 18-A | 100 | — | 93 | 100 | 98 |
| Example 19-A | 100 | 4 | 75 | 66 | 45 |

[Evaluation]

(With Regard to Examples 1 to 16)

In Examples 1 to 16, 1,3-propanesultone was used as the sulfonate, and 3-hydroxypropanesulfonic acid was used as the hydroxyalkylsulfonic acid. The addition proportion of each of these compounds was set within the range of 0.01 to 10% by mass, both inclusive. In this case, the swell of the batteries, which followed gas generation at the time of the high-temperature storage, and the self-discharge capacity were restrained as compared with those in Example 1-A, so that the discharge capacity after the cycles was at a high level.

From comparison between Examples 1, 5, 9 and 13, it is understood that as the addition proportion of 1,3-propanesultone is increased, the self-discharge capacity is lowered. This is because the amount of trapping water is increased to restrain the generation of HF further and decrease the gas generation volume as the addition proportion of 1,3-propanesultone is increased, so that the self-discharge capacity is lowered.

It is also understood that in Examples 1 to 16, both of the battery swelling and the self-discharge capacity were decreased as compared with those in Example 1-A. A reason for this is as follows: by the addition of the hydroxyalkylsulfonic acid, their negative electrode surface was covered with a sulfur-atom-containing coat having a thickness of 0.1 to 10 nm, both inclusive, so that side reactions including a gas generation reaction were restrained.

As described above, it is understood that due to the addition of 1,3-propanesultone and 3-hydroxyalkylsulfonic acid, the battery can restrain side reactions other than a battery reaction thereof, and restrain a rise in resistance to attain a high-level capacity after charge/discharge cycles.

(With Regard to Examples 2-A to 8-A)

It is understood from the results of Examples 2-A and 3-A that a shortage of 1,3-propanesultone makes it impossible to restrain battery swelling. A cause therefor is that as a result of the shortage of 1,3-propanesultone, the effect of trapping water is not sufficiently obtained so that gas generation cannot be restrained.

It is understood from the results of Examples 5-A and 6-A that a shortage of 3-hydroxypropanesulfonic acid makes it impossible to restrain the self-discharge capacity sufficiently. A cause therefor is that as a result of the shortage of 3-hydroxypropanesulfonic acid, the negative electrode coat is not sufficiently formed.

It is understood from the results of Examples 4-A and 8-A that when the proportion of 1,3-propanesultone is to be 20% by mass, which is more than 10% by mass, the initial discharge capacity and the capacity after the cycles are lowered. A cause therefor is that as a result of the excessive proportion of 1,3-propanesultone, the nonaqueous electrolyte is made high in viscosity and further the excessive proportion of 1,3-propanesultone is decomposed on the positive electrode to raise the resistance of battery.

It is understood from the results of Example 7-A that also when the proportion of 3-hydroxypropanesulfonic acid is to be 20% by mass, which is more than 10% by mass, the initial discharge capacity and the capacity after the cycles are lowered. A cause therefor is that as a result of the excessive proportion of 3-hydroxypropanesulfonic acid, the negative electrode coat is made thick to raise resistance of battery, and further the nonaqueous electrolyte is raised in acidity to corrode the active materials.

(With Regard to Examples 17 to 49)

It is understood from Examples 17 to 49 that even when a sulfonate having 4 or 5 carbon atoms is used, the gas swell quantity is significantly lowered relative to that of Example 1-A in the same way as in Examples 1 to 16, in which 1,3-propanesultone, which has 3 carbon, atoms is used. Note that, as the number of the carbon atoms is increased, the effect of trapping water becomes weaker as compared with the effect based on 1,3-propanesultone. Thus, it is also understood that these examples show a tendency that the effect of restraining the gas swelling is also degraded.

Similarly, it is understood that even when a hydroxyalkylsulfonic acid having the different numbers of carbon atoms from 3 is used, a dense protective coat can be formed on the negative electrode surface in the same way as in Examples 1 to 16, in which a hydroxyalkylsulfonic acid having 3 carbon atoms is used, so that self-discharge can be restrained and the cycle discharge capacity can be maintained.

(With Regard to Examples 9-A and 15-A)

It is understood from the results of Examples 9-A to 11-A and Example 15-A that: when a sulfonate having 4 carbon atoms, that is, 1,4-butanesultone is used in a proportion of less than 0.01% by mass, the gas-swell restraining effect is not gained; and when the sulfonate is used in a proportion of 20% by mass, which is more than 10% by mass, the capacity is lowered, which follows a rise in the resistance.

It is understood from the results of Examples 12-A to 15-A that: when a hydroxyalkylsulfonic acid having 4 carbon atoms, that is, 4-hydroxybutanesulfonic acid is used in a proportion of less than 0.01% by mass, the self-discharge restraining effect based on the formation of the protective coat is not gained; and when the sulfonic acid is used in a proportion of 20% by mass, which is more than 10% by mass, the capacity is lowered, which follows a rise in the resistance.

(With Regard to Examples 16-A to 18-A)

It is understood from the results of Examples 16-A to 18-A that when a sulfonate having 6 carbon atoms, that is, 1,6-hexanesultone is used, the effect of trapping water is not sufficiently obtained so that the gas swell cannot be sufficiently restrained. It is also understood that when a hydroxyalkylsulfonic acid having 6 carbon atoms, that is, 6-hydroxyhexanesulfonic acid is used, no dense coat is formed on the negative electrode surface so that the self-discharge cannot be sufficiently restrained.

(With Regard to Example 19-A)

It is understood from Example 19-A that when methyl methanesulfonate is used as a sulfonate having a chain molecular structure, the discharge capacity of battery is largely lowered in discharge capacity after subjected to the cycles. This is because an alcohol (methanol) is produced by the hydrolysis of methyl methanesulfonate to generate gas and a rise in the resistance, which is caused by electrochemical decomposition of the alcohol.

The following will describe a battery pack according to another embodiment. The battery pack has one or more nonaqueous electrolyte secondary batteries (unit cells) as described above. When the battery pack has multiple unit cells, the unit cells are electrically connected to each other in series or in parallel. Such a battery pack will be described with reference to FIGS. 2 and 3.

Figure 3:
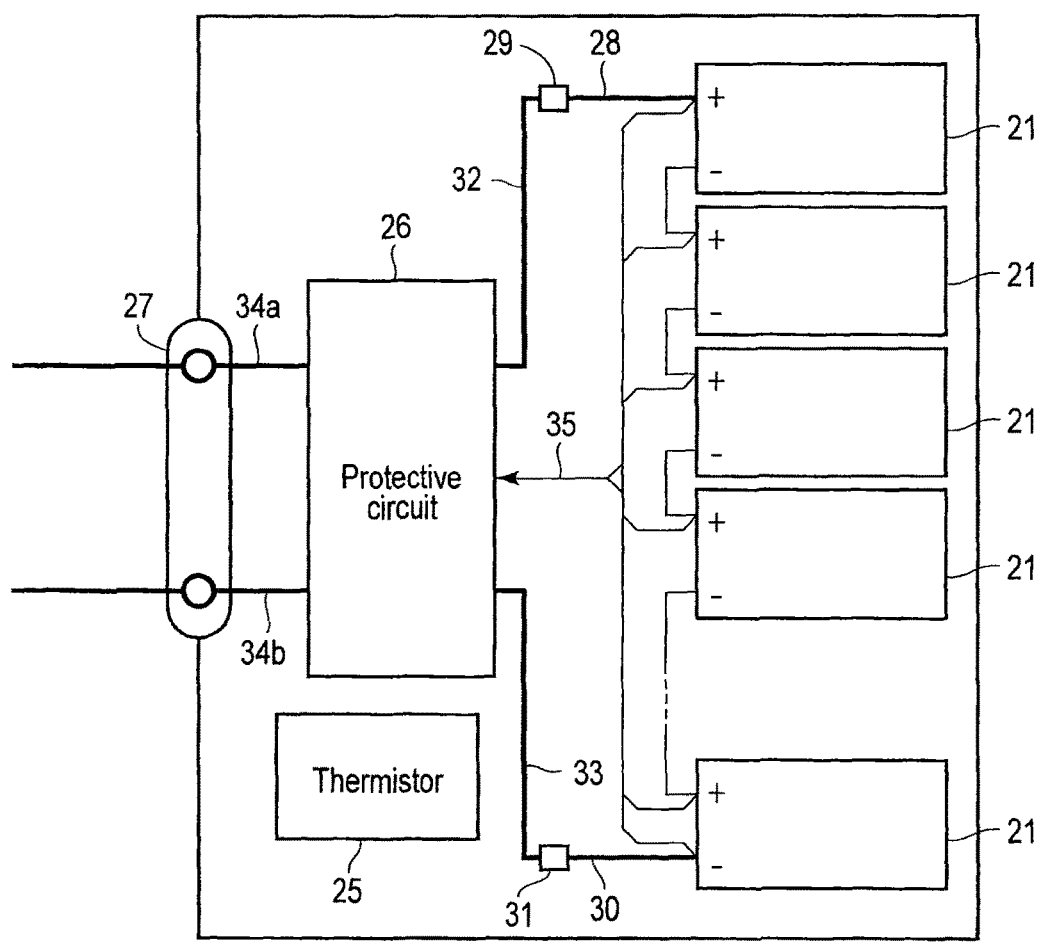
FIG. 3 is a circuit chart showing a connection state of a battery pack according to another embodiment.

Multiple unit cells 21 each made of a flat nonaqueous electrolyte secondary battery are laminated onto each other to direct a negative electrode terminal 5 and a positive electrode terminal 6 extended outwards in the same direction. The cells are fastened with each other through an adhesive tape 22 to constitute an battery module 23. As shown in FIG. 3, these unit cells 21 are electrically connected to each other in series.

A printed wiring board 24 is arranged opposite to a side surface of the unit cells 21 from which the negative electrode terminal 5 and the positive electrode terminal 6 are extended outward. A thermistor 25, a protective circuit 26, and an energizing terminal 27 to an external instrument are mounted on the printed wiring board 24 as shown in FIG. 3. An electric insulating plate (not shown) is attached to the surface of the printed wiring board 24 that faces the battery module 23 to avoid unnecessary connection of the wiring of the battery module 23.

A positive-electrode-side lead 28 is connected to the positive electrode terminal 6 located at the bottom layer of the battery module 23 and the end thereof is inserted into a positive-electrode-side connector 29 of the printed wiring board 24 so as to be electrically connected. A negative-electrode-side lead 30 is connected to the negative electrode terminal 5 located at the top layer of the battery module 23 and the end thereof is inserted into a negative-electrode-side connector 31 of the printed wiring board 24 so as to be electrically connected thereto. The connectors 29 and 31 are connected to the protective circuit 26 through wirings 32 and 33 formed in the printed wiring board 24.

The thermistor 25 detects the temperature of the unit cells 21 and a detection signal thereof is sent to the protective circuit 26. The protective circuit 26 can shut down a plus-side wiring 34a and a minus-side wiring 34b between the protective circuit 26 and energizing terminal 27 to an external instrument under a predetermined condition. The predetermined condition is, for example, a condition in which the detection temperature of the thermistor 25 becomes a predetermined temperature or higher. Further, the predetermined condition indicates, for example, a condition in which the overcharge, overdischarge, or over-current of the unit cells 21 is detected. The overcharge detection or the like may be performed on each of the unit cells 21 or all of the unit cells 21. When each of the unit cells 21 is detected, the cell voltage may be detected, or the positive electrode or negative electrode potential may be detected. In the latter case, a lithium electrode to be used as a reference electrode is inserted into each of the unit cells 21. In the case of FIGS. 2 and 3, wirings 35 for voltage detection are connected to the unit cells 21, respectively, and detection signals are sent to the protective circuit 26 through the wirings 35.

Protective sheets 36 composed of rubber or resin are arranged on three respective side surfaces of the battery module 23, and not on the side surface from which the positive electrode terminal 6 and the negative electrode terminal 5 protrude.

The battery module 23 is housed in a housing container 37 together with each of the protective sheets 36 and the printed wiring board 24. That is, the protective sheets 36 are arranged on both internal surfaces in the long side direction of the housing container 37 and on one of the internal surfaces in the short side direction. The printed wiring board 24 is arranged on the other internal surface, that is, the other-side internal surface in the short side direction. The battery module 23 is located in a space surrounded by the protective sheets 36 and the printed wiring board 24. A lid 38 is attached to the upper surface of the housing container 37.

In order to fix the battery module 23, a heat-shrinkable tape may be used in place of the adhesive tape 22. In this case, the battery module is bound by placing the protective sheets on both sides of the battery module, revolving the heat-shrinkable tube, and thermally shrinking the heat-shrinkable tube.

In FIGS. 2 and 3, the form in which the unit cells 21 are connected to each other in series is shown. However, in order to increase the battery capacity, the cells may be connected in parallel. The battery packs assembled can be connected to each other in series or in parallel.

The form of the battery pack is appropriately changed according to an article in which the pack is used. The article, in which the battery pack is used, is preferably an article for which cycle characteristics based on large current characteristic are desired. Specific examples of the article include power sources for digital cameras; and vehicles such as two- or four-wheel hybrid electric vehicles, two- or four-wheel electric vehicles, and assisted bicycles. The battery pack is in particular preferably used for a vehicle.

In order to examine the effects on the characteristics of a battery by the respective contents of a hydroxyalkylsulfonic acid and a sulfonate in its nonaqueous electrolyte, batteries of Examples 50 to 67 were further produced as described below, and then tested.

Examples 50 to 67

In the same way as used to produce the nonaqueous electrolyte secondary batteries of Examples 1 to 49, the batteries of Examples 50 to 67 were produced. Note that, as shown in Table 5 described below, hydroxyalkylsulfonic acid conditions and sulfonate conditions were changed to perform the production.

TABLE 5

| | Composition and Blend Ratio of Nonaqueous electrolyte ("%" denotes % by mass) | |
| --- | --- | --- |
| | Sulfonate | Sulfonate |
| Example 50 | 0.01% 1,3-Propanesultone | 15% 3-Hydroxypropanesulfonic acid |
| Example 51 | 0.1% 1,3-Propanesultone | 15% 3-Hydroxypropanesulfonic acid |
| Example 52 | 1% 1,3-Propanesultone | 15% 3-Hydroxypropanesulfonic acid |
| Example 53 | 10% 1,3-Propanesultone | 15% 3-Hydroxypropanesulfonic acid |
| Example 54 | 15% 1,3-Propanesultone | 0.01% 3-Hydroxypropanesulfonic acid |
| Example 55 | 15% 1,3-Propanesultone | 0.1% 3-Hydroxypropanesulfonic acid |
| Example 56 | 15% 1,3-Propanesultone | 1% 3-Hydroxypropanesulfonic acid |
| Example 57 | 15% 1,3-Propanesultone | 10% 3-Hydroxypropanesulfonic acid |
| Example 58 | 15% 1,3-Propanesultone | 15% 3-Hydroxypropanesulfonic acid |
| Example 59 | 0.01% 1,4-Buthanesultone | 15% 4-Hydroxybuthanesulfonic acid |
| Example 60 | 0.1% 1,4-Buthanesultone | 15% 4-Hydroxybuthanesulfonic acid |
| Example 61 | 1% 1,4-Buthanesultone | 15% 4-Hydroxybuthanesulfonic acid |
| Example 62 | 10% 1,4-Buthanesultone | 15% 4-Hydroxybuthanesulfonic acid |
| Example 63 | 1% 1,3-Propanesultone | 15% 4-Hydroxybuthanesulfonic acid |
| Example 64 | 1% 1,4-Buthanesultone | 15% 3-Hydroxypropanesulfonic acid |
| Example 65 | 1% 1,3-Propanesultone | 18% 3-Hydroxypropanesulfonic acid |
| Example 66 | 18% 1,3-Propanesultone | 1% 3-Hydroxypropanesulfonic acid |
| Example 67 | 1% 1,4-Buthanesultone | 18% 4-Hydroxybuthanesulfonic acid |

The batteries of Examples 50 to 67 were subjected to the same tests as in Examples 1 to 49 and Examples 1-A to 19-A. Test results of Examples 50 to 67 are shown in Table 6 described below.

TABLE 6

| | Initial Discharge Capacity (relative ratio) | Thickness of Protective Layer containing S (nm) | Swelling of Battery (relative ratio) | Self-Discharge Capacity (relative ratio) | Discharge Capacity after the Cycles (relative ratio) |
| --- | --- | --- | --- | --- | --- |
| Example 50 | 98 | 11 | 44 | 52 | 96 |
| Example 51 | 95 | 12 | 35 | 42 | 94 |

TABLE 6-continued

| | Initial Discharge Capacity (relative ratio) | Thickness of Protective Layer containing S (nm) | Swelling of Battery (relative ratio) | Self-Discharge Capacity (relative ratio) | Discharge Capacity after the Cycles (relative ratio) |
|---|---|---|---|---|---|
| Example 52 | 95 | 13 | 24 | 15 | 94 |
| Example 53 | 93 | 16 | 22 | 15 | 91 |
| Example 54 | 98 | 2 | 41 | 55 | 101 |
| Example 55 | 98 | 2 | 37 | 51 | 102 |
| Example 56 | 96 | 4 | 32 | 29 | 100 |
| Example 57 | 93 | 11 | 25 | 15 | 96 |
| Example 58 | 90 | 17 | 18 | 14 | 90 |
| Example 59 | 100 | 10 | 49 | 69 | 96 |
| Example 60 | 98 | 10 | 42 | 50 | 95 |
| Example 61 | 97 | 11 | 32 | 23 | 95 |
| Example 62 | 95 | 13 | 27 | 22 | 94 |
| Example 63 | 97 | 11 | 26 | 22 | 94 |
| Example 64 | 98 | 12 | 32 | 17 | 95 |
| Example 65 | 92 | 18 | 24 | 15 | 81 |
| Example 66 | 93 | 4 | 28 | 30 | 88 |
| Example 67 | 93 | 15 | 32 | 23 | 83 |

From the results shown in Table 6, it is understood that the batteries of Examples 54 to 58 and Example 66, in each of which a sulfonate was used in a proportion of more than 10% by mass but not more than 18% by mass, were better in initial discharge capacity and discharge capacity after the cycles than Examples 4-A, 8-A, 11-A and 15-A (shown in Tables 2 and 4), in each of which a sulfonate was used in a proportion of 20% by mass, and thus are practical batteries.

From the results shown in Table 6, it is also understood that the batteries of Examples 50 to 53, 58 to 65, and 67, in each of which a hydroxyalkylsulfonic acid was used in a proportion of more than 10% by mass but not more than 18% by mass, were better in initial discharge capacity and discharge capacity after the cycles than Examples 7-A, 8-A, 14-A and 15-A (shown in Tables 2 and 4), in each of which a hydroxyalkylsulfonic acid was used in a proportion of 20% by mass, and thus are practical batteries.

In conclusion, it is understood from the results of the batteries of Examples 1 to 67 and Examples 1-A to 19-A that the content of a sulfonate in the nonaqueous electrolyte is preferably from 0.01 to 18% by mass, both inclusive, more preferably from 0.01 to 15% by mass, both inclusive, even more preferably from 0.01 to 10% by mass, both inclusive. Similarly, it is understood that the content of a hydroxyalkylsulfonic acid in the nonaqueous electrolyte is preferably from 0.01 to 18% by mass, both inclusive, more preferably from 0.01 to 15% by mass, both inclusive, even more preferably from 0.01 to 10% by mass, both inclusive.

It is also understood from the results shown in Table 6 that the batteries of Examples 54 to 58 and Example 66, in each of which a hydroxyalkylsulfonic acid was used in a proportion of from 0.01 to 15% by mass, both inclusive, and those of Examples 50 to 53, 59 to 65, and 67, in each of which a hydroxyalkylsulfonic acid was used in a proportion of more than 10% by mass but not more than 18% by mass, exhibited remarkably smaller self-discharge capacity than Examples 1-A, 5-A and 12-A (shown in Tables 2 and 4), in each of which no hydroxyalkylsulfonic acid was used.

It is also understood from the results shown in Table 6 that the batteries of Examples 54 to 58 and 66, in each of which a sulfonate was used in a proportion of more than 10% by mass but not more than 18% by mass, and those of Examples 50 to 53, 59 to 65, and 67, in each of which a sulfonate was used in a proportion of from 0.01 to 10% by mass, both inclusive, exhibited remarkably smaller battery swelling than Examples 1-A, 2-A and 9-A (shown in Tables 2 and 4), in each of which no hydroxyalkylsulfonic acid was used.

The expression "% by mass" for each of the components in the nonaqueous electrolyte described in each of the above-mentioned examples denotes the percentage of the total amount of nonaqueous electrolyte by mass; that is, the percentage by mass of the total amount of nonaqueous solvent, electrolyte, hydroxyalkylsulfonic acid(s) and sulfonate(s).

The following will describe an advantageous effect obtained by using one or more hydroxyalkylsulfonic acids and one or more sulfonates in combination in the nonaqueous electrolyte.

As described above, one or more sulfonates can exhibit a function of trapping water in the nonaqueous electrolyte. Thus, when the sulfonate(s) is/are present in the nonaqueous electrolyte, the generation of hydrogen fluoride can be restrained so that the surface of the active materials can be restrained from being corroded by hydrogen fluoride. As the negative electrode active material has a surface that is less corroded, the hydroxyalkylsulfonic acid(s) can more easily adhere onto the surface.

For this reason, in the nonaqueous electrolyte in which one or more hydroxyalkylsulfonic acids and one or more sulfonates are present together, the hydroxyalkylsulfonic acid(s) adhere(s) more easily onto the surface of the negative electrode active material than in any nonaqueous electrolyte in which the hydroxyalkylsulfonic acid(s) is/are present but the sulfonate(s) is/are not present. As a result, in the former, a protective coat is more easily formed on the surface of the negative electrode active material.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The claims are as follows:

1. A nonaqueous electrolyte secondary battery, comprising:
   a positive electrode;
   a negative electrode comprising lithium titanium oxide; and
   a nonaqueous electrolyte, the nonaqueous electrolyte consisting of:
      a nonaqueous solvent,
      an electrolyte,
      0.01 to 18% by mass of at least one selected from the group consisting of hydroxymethanesulfonic acid, 2-hydroxyethanesulfonic acid, 3-hydroxypropanesulfonic acid, 4-hydroxybutanesulfonic acid, 5-hydroxypentanesulfonic acid, 3-hydroxypropenesulfonic acid, and 4-hydroxybutylenesulfonic acid, and
      at least one sulfonate having a cyclic structure.

2. The nonaqueous electrolyte secondary battery according to claim 1, wherein the at least one sulfonate having a cyclic structure is selected from the group consisting of 1,2-ethanesultone, 1,3-propanesultone, 1,4-butanesultone, 1,5-pentanesultone, 1,3-propenesultone, and 1,4-butenesultone, and a content rate of the at least one sulfonate having a cyclic structure in the nonaqueous electrolyte is from 0.01 to 18% by mass.

3. The nonaqueous electrolyte secondary battery according to claim 1, wherein the negative electrode has, on a surface of the negative electrode, a coat comprising sulfur atoms on a surface of the negative electrode, and the coat has a thickness of 0.1 to 10 nm.

4. The nonaqueous electrolyte secondary battery according to claim 1, wherein the lithium titanium oxide is a spinel-type lithium titanate.

5. A battery pack comprising the nonaqueous electrolyte secondary battery according to claim 1.

6. The nonaqueous electrolyte secondary battery according to claim 1, wherein the lithium titanium oxide is a ramsdellite-type lithium titanate.

7. The nonaqueous electrolyte secondary battery according to claim 1, wherein the lithium titanium oxide has an average primary particle size of 5 µm or less.

8. The nonaqueous electrolyte secondary battery according to claim 1, wherein the lithium titanium oxide has a specific surface area of 1 to 10 $m^2/g$.

9. The nonaqueous electrolyte secondary battery according to claim 1, wherein:
the concentration of the electrolyte in the nonaqueous electrolyte is 0.5 to 2 mol/L;
the content rate of the at least one selected from the group consisting of hydroxymethanesulfonic acid, 2-hydroxyethanesulfonic acid, 3-hydroxypropanesulfonic acid, 4-hydroxybutanesulfonic acid, 5-hydroxypentanesulfonic acid, 3-hydroxypropenesulfonic acid, and 4-hydroxybutylenesulfonic acid in the nonaqueous electrolyte is 0.01 to 10% by mass; and
the content rate of the at least one sulfonate having a cyclic structure in the nonaqueous electrolyte is 0.01 to 10% by mass.

10. The nonaqueous electrolyte secondary battery according to claim 9, wherein:
the content rate of the at least one selected from the group consisting of hydroxymethanesulfonic acid, 2-hydroxyethanesulfonic acid, 3-hydroxypropanesulfonic acid, 4-hydroxybutanesulfonic acid, 5-hydroxypentanesulfonic acid, 3-hydroxypropenesulfonic acid, and 4-hydroxybutylenesulfonic acid in the nonaqueous electrolyte is 0.1 to 2% by mass; and
the content rate of the at least one sulfonate having a cyclic structure in the nonaqueous electrolyte is 0.1 to 2% by mass.

11. The nonaqueous electrolyte secondary battery according to claim 10, wherein the lithium titanium oxide has an average primary particle size of 5 µm or less.

12. The nonaqueous electrolyte secondary battery according to claim 10, wherein the lithium titanium oxide has a specific surface area of 1 to 10 $m^2/g$.

13. The nonaqueous electrolyte secondary battery according to claim 1, wherein:
the concentration of the electrolyte in the nonaqueous electrolyte is 0.5 to 2 mol/L;
the content rate of the at least one selected from the group consisting of hydroxymethanesulfonic acid, 2-hydroxyethanesulfonic acid, 3-hydroxypropanesulfonic acid, 4-hydroxybutanesulfonic acid, 5-hydroxypentanesulfonic acid, 3-hydroxypropenesulfonic acid, and 4-hydroxybutylenesulfonic acid in the nonaqueous electrolyte is 0.01 to15% by mass; and
the content rate of the at least one sulfonate having a cyclic structure in the nonaqueous electrolyte is 0.01 to 15% by mass.

14. The nonaqueous electrolyte secondary battery according to claim 1, wherein:
the concentration of the electrolyte in the nonaqueous electrolyte is 0.5 to 2 mol/L;
the content rate of the at least one selected from the group consisting of hydroxymethanesulfonic acid, 2-hydroxyethanesulfonic acid, 3-hydroxypropanesulfonic acid, 4-hydroxybutanesulfonic acid, 5-hydroxypentanesulfonic acid, 3-hydroxy propenesulfonic acid, and 4-hydroxy butylenesulfonic acid in the nonaqueous electrolyte is 0.1 to 18% by mass; and
the content rate of the at least one sulfonate having a cyclic structure in the nonaqueous electrolyte is 0.1 to 18% by mass.

15. The nonaqueous electrolyte secondary battery according to claim 1, wherein said at least one sulfonate having a cyclic structure has 2-5 carbon atoms.

* * * * *